United States Patent
Yamakawa

(10) Patent No.: US 8,248,545 B2
(45) Date of Patent: Aug. 21, 2012

(54) PROJECTOR

(75) Inventor: Hidemasa Yamakawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 240 days.

(21) Appl. No.: 12/861,272

(22) Filed: Aug. 23, 2010

(65) Prior Publication Data

US 2011/0043712 A1 Feb. 24, 2011

(30) Foreign Application Priority Data

Aug. 24, 2009 (JP) .................. 2009-192850

(51) Int. Cl.
*G02F 1/1335* (2006.01)

(52) U.S. Cl. .................. 349/9; 349/1; 349/5; 349/8

(58) Field of Classification Search .................. 349/1, 5, 349/8, 9
See application file for complete search history.

(56) References Cited

U.S. PATENT DOCUMENTS

| 6,891,577 B2 | 5/2005 | Sekine et al. | |
| 7,653,097 B2 * | 1/2010 | Gollier et al. | 372/27 |
| 7,784,949 B2 * | 8/2010 | Yamauchi | 353/94 |

FOREIGN PATENT DOCUMENTS

| CN | 1485648 A | 3/2004 |
| JP | A-10-268235 | 10/1998 |
| JP | A-2004-61569 | 2/2004 |
| JP | A-2004-240022 | 8/2004 |
| JP | A-2007-127851 | 5/2007 |

* cited by examiner

*Primary Examiner* — Jennifer Doan
(74) *Attorney, Agent, or Firm* — Oliff & Berridge, PLC

(57) ABSTRACT

A projector includes: a light source; a polarization conversion unit that converts the light flux from the light source into polarized light having a plane of polarization parallel to a first direction; a color separation/light guiding system including a separating surface and at least one optical-path deflecting mirror; and a plurality of light modulators, wherein the separating surface is disposed in such a way that the plane of incidence of the polarized light with respect to the separating surface is perpendicular to the first direction, and the at least one optical-path deflecting mirror is disposed in such a way that the plane of incidence of the corresponding polarized light flux from the separating surface with respect to the optical-path deflecting mirror is parallel to the first direction.

7 Claims, 4 Drawing Sheets

PROJECTOR

BACKGROUND

1. Technical Field

The present invention relates to a projector that projects as an image a light flux modulated, for example, by a reflective liquid crystal panel.

2. Related Art

There is a projector in which a cross dichroic mirror separates the light flux from an illumination system into a plurality of color light fluxes, which are then guided to respective optical paths and illuminate three reflective liquid crystal panels disposed in the optical paths for the respective colors, and the color light fluxes modulated by the three reflective liquid crystal panels are combined in a cross dichroic prism (see JP-A-2007-127851 and JP-A-2004-240022, for example).

The projector disclosed in JP-A-2004-240022 has a structure in which a first flat plane perpendicular to two dichroic mirrors that form a cross dichroic mirror for color separation is perpendicular to a second flat plane perpendicular to two optical-path deflecting mirrors adjacent to the cross dichroic mirror in order to reduce the size of the optical system.

In the projector disclosed in JP-A-2007-127851, illumination light incident on two dichroic mirrors that form a cross dichroic mirror is P-polarized light, which makes it difficult to increase the efficiency at which target color light is separated when the illumination light is reflected off the dichroic mirrors. To intentionally increase the color separation efficiency through reflection, an expensive cross dichroic mirror is required.

On the other hand, in the projector disclosed in JP-A-2004-240022, no consideration of the plane of polarization is made for light fluxes incident on the cross dichroic mirror, polarizing beam splitters and other components, which makes it difficult to achieve bright illumination because the efficiencies at which the polarized light is reflected, separated, and otherwise processed decrease. Further, since polarizing beam splitter cubes facing respective reflective liquid crystal panels are used, increase in temperature causes thermal distortion in the glass members, which then results in change in the state of polarization. Further, increase in the angle of light results in decrease in contrast due to the dependence of the polarized light separation characteristics of dielectric multilayer films on the angle.

SUMMARY

An advantage of some aspects of the invention is to provide a projector that allows the color separation efficiency, for example, in a cross dichroic mirror to be readily increased.

A projector according to an aspect of the invention includes a light source, a polarization conversion unit that converts the light flux from the light source into polarized light having a plane of polarization parallel to a first direction, a color separation/light guiding system including a separating surface that separates the polarized light having exited from the polarization conversion unit into light fluxes having different wavelength bands and at least one optical-path deflecting mirror that deflects the corresponding one of the light fluxes having traveled via the separating surface, and a plurality of light modulators illuminated with the respective light fluxes separated by the color separation/light guiding system. In the projector of an aspect of the invention, the separating surface is disposed in such a way that the plane of incidence of the polarized light with respect to the separating surface is perpendicular to the first direction, and the at least one optical-path deflecting mirror is disposed in such a way that the plane of incidence of the corresponding polarized light flux having traveled via the separating surface with respect to the optical-path deflecting mirror is parallel to the first direction. The polarized light having a plane of polarization parallel to the first direction described above maintains its essential direction of polarization unless the polarized light undergoes a phase effect, for example, in a retarder. That is, a state in which polarized light has a plane of polarization parallel to the first direction is assumed to mean a state of polarization in a projector whose optical path of is transformed into a linear optical path. The polarized light guided from the polarization conversion unit, for example, to the color separation/light guiding system therefore undergoes a process in which the direction of the oscillation of the electric field apparently changes when the optical path is deflected, for example, in the color separation/light guiding system, but the plane of polarization in the first direction is essentially maintained unless the polarized light undergoes a phase effect, for example, in a retarder.

According to the projector described above, since the plane of incidence of the polarized light with respect to the separating surface is perpendicular to the first direction, the efficiency at which target wavelength light is separated when the polarized light is reflected off the separating surface can be increased even when the color separation/light guiding system including the separating surface is a relatively simple and inexpensive one. The planes of incidence of the polarized light fluxes having traveled via the separating surface are set to be parallel to the first direction described above in consideration of the fact that the polarized light fluxes to be incident on the light modulators and optical elements disposed downstream thereof along the respective optical paths need to have appropriate planes of polarization. For example, when each of the light modulators includes a polarized light separation element, the efficiency at which the polarized light separation element transmits a light flux incident thereon can be increased when the plane of incidence of the light flux is parallel to the first direction.

In a typical arrangement of the polarization conversion unit and the separating surface, the advantageous effect described above can also be achieved by inserting a half-wave plate between the separating surface and each of the optical-path deflecting mirrors or between each of the optical-path deflecting mirror and the corresponding light modulator. In this case, however, inserting a half-wave plate may reduce the contrast of a projected image, and the half-wave plate itself, which is irradiated with the illumination light flux, may be degraded over time.

In a specific embodiment or aspect of the invention, the projector can be configured such that each of the plurality of light modulators includes a reflective liquid crystal panel that outputs modulated light through the surface on which light is incident and a polarized light separation element that transmits the polarized light of the light from the color separation/light guiding system and having the plane of polarization parallel to the first direction and reflects a polarized light of the light modulated by the reflective liquid crystal panel and having a plane of polarization parallel to a second direction different from the first direction, and that the polarized light separation element is disposed in such a way that the plane of incidence of the corresponding polarized light flux from the color separation/light guiding system with respect to the polarized light separation element is parallel to the first direction. In this case, the polarized light separation element can efficiently transmit the illumination light flux from the color separation/light guiding system, whereby the liquid crystal panel can be illuminated with high-luminance light.

In another aspect of the invention, the polarized light separation element is a flat-plate-shaped optical element having a birefringent structure. The flat-plate-shaped optical element having a birefringent structure means a polarizing element using structural birefringence. Specific examples of the flat-plate-shaped optical element having a birefringent structure include a wire-grid-type polarizer and a stacked photonic crystal-type polarizer. A wire-grid-type polarizer and other similar polarizers are highly stable against temperature and other environmental factors at which the polarizer is used and hence achieve increased reliability at a relatively low cost.

In still another aspect of the invention, the optical element is disposed in such a way that the plane of incidence of the polarized light from the reflective liquid crystal panel with respect to the birefringent structure is perpendicular to the second direction. In this case, the image light reflected off the liquid crystal panel and having a polarized light component in the second direction can be efficiently reflected off the polarized light separation element, whereby a bright image can be projected.

In yet another aspect of the invention, the projector further includes a light combining system including a combining surface where the light fluxes having traveled via the plurality of light modulators are combined and a projection system that projects the combined light having exited from the light combining system. Each of the plurality of light modulators includes a transmissive liquid crystal panel that modulates transmitted light and a polarizer that transmits the polarized light of the light modulated by the transmissive liquid crystal panel and having a plane of polarization parallel to a second direction different from the first direction, and the light combining system is disposed in such a way that the plane of incidence of the polarized light from at least one of the plurality of light modulators with respect to the combining surface is perpendicular to the second direction. In this case, the image light from the polarizer in the light modulator can be efficiently reflected off the combining surface of the light combining system, whereby a bright image can be projected.

In still yet another aspect of the invention, the color separation/light guiding system includes a first dichroic mirror and a second dichroic mirror intersecting each other as the separating surface, and that the intersection axis of the first and second dichroic mirrors, a system optical axis extending toward the light-exiting side of the polarization conversion unit, and another system optical axis extending toward the light-exiting side of the first and second dichroic mirrors are perpendicular to one another. In this case, the polarized light having exited from the polarization conversion unit can be incident on the first and second dichroic mirrors in such a way that the planes of incidence of the polarized light with respect to the first and second dichroic mirrors are perpendicular to the first direction, and the polarized light fluxes having exited from the first and second dichroic mirrors can be incident on the respective optical-path deflecting mirrors in such a way that the planes of incidence of the polarized light fluxes with respect to the optical-path deflecting mirrors are parallel to the first direction.

In further another aspect of the invention, the color separation/light guiding system further includes a third dichroic mirror disposed downstream of the first and second dichroic mirrors in the optical path, the third dichroic mirror further separating one of the light fluxes separated by the first and second dichroic mirrors into light fluxes having different wavelength bands, and that the third dichroic mirror is disposed in such a way that the plane of incidence of the one of the light fluxes with respect to the third dichroic mirror is parallel to the first direction. In this case, the third dichroic mirror can be readily disposed in the color separation/light guiding system.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
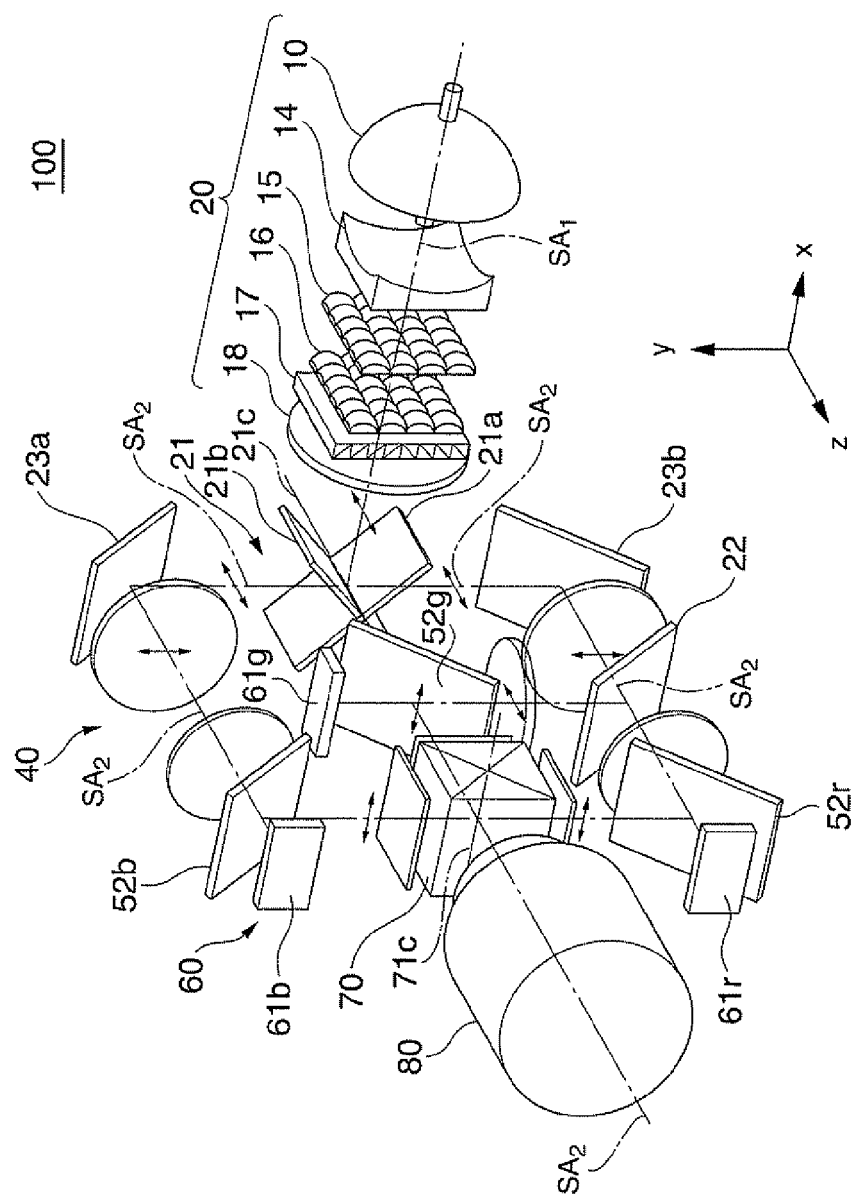
FIG. 1 is a perspective view for describing the configuration of the optical system of a projector according to a first embodiment.
Figure 2:
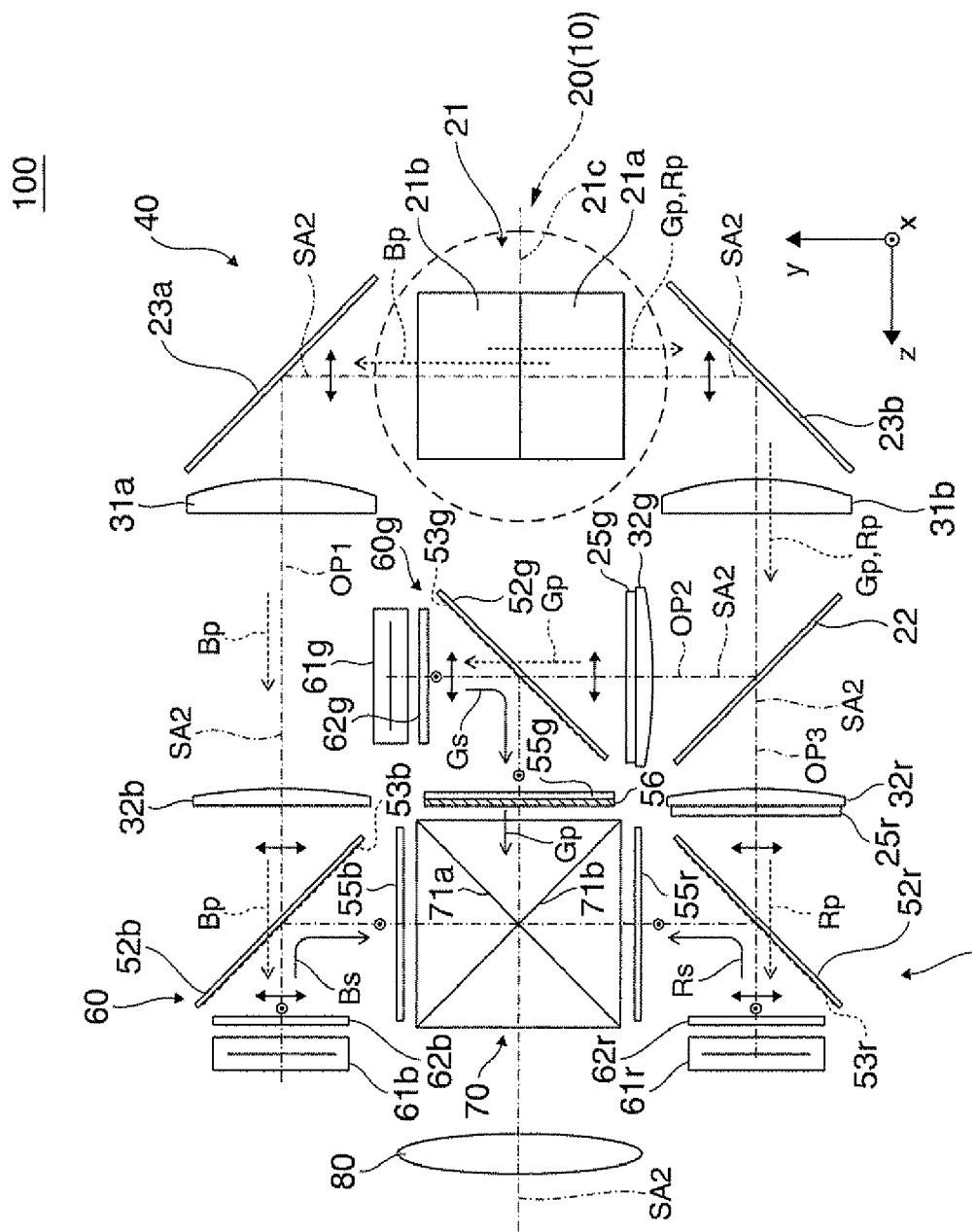
FIG. 2 is a plan view of the optical system of the projector shown in FIG. 1.
Figure 3:
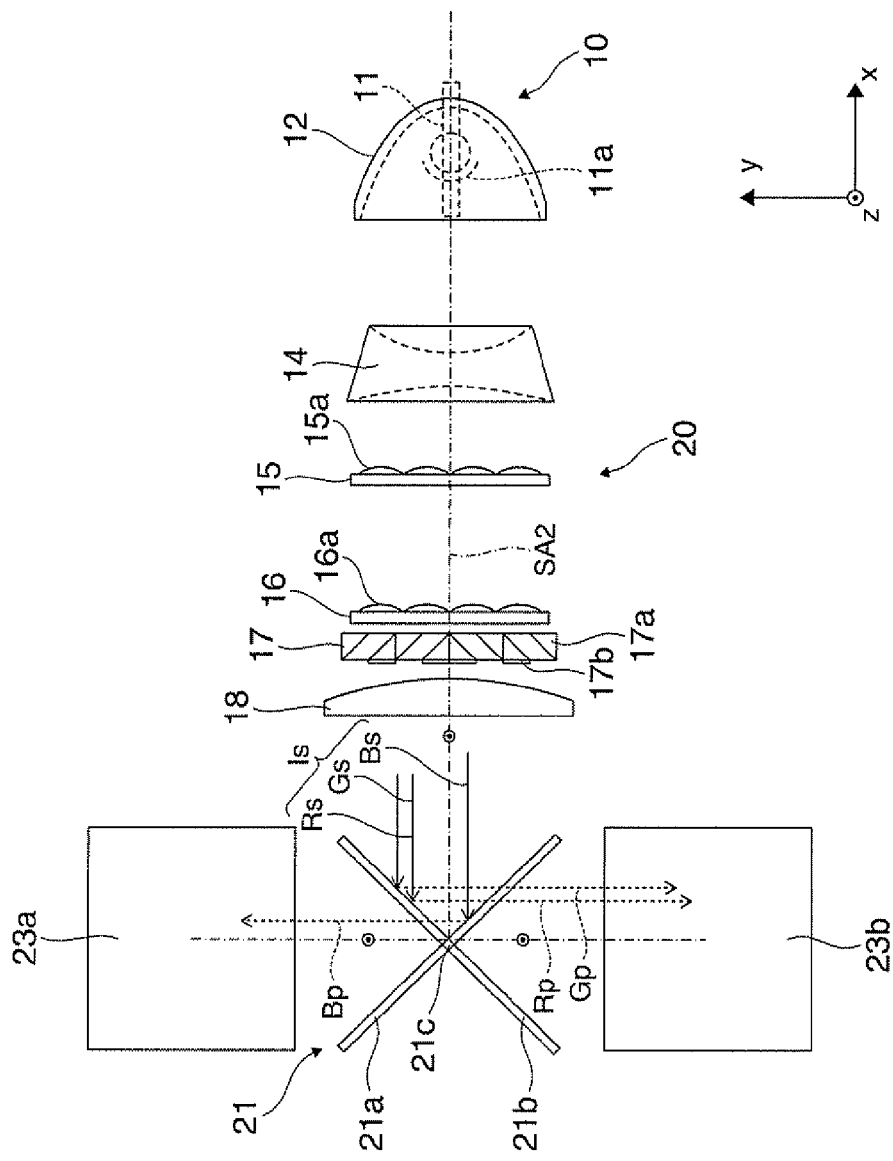
FIG. 3 is a plan view for describing part of the optical system of the projector shown in FIG. 1 when viewed from the −z direction.

The configuration of the optical system of a projector according to a first embodiment of the invention will be described below with reference to FIGS. 1 to 3. In FIGS. 1 to 3, x, y, and z mean three coordinate axes that form a three-dimensional orthogonal coordinate system.

A projector 100 shown in the drawings includes an illumination system 20 that emits illumination light, a color separation/light guiding system 40 that separates the illumination light from the illumination system 20 into blue, green, and red, three color light fluxes, a light modulating unit 60 that modulates the three color light fluxes having exited from the color separation/light guiding system 40 in accordance with image information, a light combining system 70 that combines respective color image light fluxes having exited from the light modulating unit 60, and a projection system 80 that projects the image light combined by the light combining system 70 on a screen (not shown). The portion ranging from the illumination system 20 to the light combining system 70 is accommodated in an optical part housing (not shown). In the projector 100, a system optical axis SA1 in the illumination system 20 extends in parallel to the x axis and in perpendicular to the yz plane (reference plane), and a system optical axis SA2 in the other portion ranging from the color separation/light guiding system 40 to the light combining system 70 is parallel to the yz plane (reference plane), which is perpendicular to the x axis.

In the thus configured projector 100, the illumination system 20 includes a light source apparatus 10, a concave lens 14, first and second lens arrays 15, 16, a polarization converter 17, and a superimposing lens 18. The light source apparatus 10 includes an arc tube 11, which is a light source that emits an illumination light flux, such as a high-pressure mercury lamp, a sub-mirror 11a that redirects the light flux emitted forward from the arc tube 11, that is, toward the superimposing lens 18 and other components (primarily in the −x direction in the present embodiment), back to the arc tube 11, and a concave mirror 12 that collects the light flux emitted backward from the arc tube 11 and redirects the collected light flux forward. The concave lens 14 serves to parallelize the light flux from the light source apparatus 10 but may be omitted when the concave mirror 12 is, for example, a parabolic mirror. The first lens array 15 is formed of a plurality of element lenses 15a arranged in a matrix and divides the light flux having exited through the lens 14 in accordance with the sections corresponding to the element lenses 15a. The second lens array 16 is formed of a plurality of element lenses 16a arranged in correspondence with the plurality of element lenses 15a and adjusts the divergence of the divided light fluxes from the plurality of element lenses 15a. The polarization converter 17 is a polarization conversion unit that converts the divided light fluxes having exited from the lens array 16 only into linearly polarized light having a plane of polarization parallel to a first direction (z direction in the present embodiment) and supplies the linearly polarized light to a downstream optical system. The superimposing lens 18 causes as appropriate illumination light Is, which is the linearly polarized light having passed through the polarization converter 17, to converge as a whole, allowing superimposed illumination on areas to be illuminated, that is, liquid crystal light valves 60b, 60g, and 60r for the respective colors provided in the light modulating unit 60. That is, the illumination light Is having passed through the lens arrays 15, 16 and the superimposing lens 18 passes through the color separation/light guiding system 40, which will be described below in detail, resulting in uniform superimposed illumination on liquid crystal panels 61b, 61g, and 61r for the respective colors provided in the light modulating unit 60.

The polarization converter 17 includes a plurality of prism elements 17a, each of which has a structure in which a PBS and a mirror are incorporated. The polarization converter 17 further includes a plurality of wave plates 17b, each of which is attached onto one surface of the corresponding prism element 17a, that is, a light-exiting surface. Each of the prism elements 17a is a rod-shaped member extending in the z direction, and the plurality of prism elements 17a are arranged in the y direction into a plate shape extending as a whole in parallel to the yz plane. The illumination light Is (Bs, Gs, and Rs), which is the light linearly polarized in the first direction as described above, exits from the polarization converter 17. The first direction used herein means the direction of the plane of polarization or the direction in which the electric field oscillates when the optical path of the projector 100 is unfolded into a straight line. The light polarized in the first direction still maintains its plane of polarization to be parallel to the first direction after the optical path is deflected by a cross dichroic mirror 21, optical-path deflecting mirrors 23a and 23b, which will be described later, and other components and hence the plane of oscillation is apparently changed. The liquid crystal panels 61b, 61g, and 61r then switch the plane of polarization to be parallel to a second direction rotated from the first direction by 90 degrees.

The color separation/light guiding system 40 includes a cross dichroic mirror 21, a dichroic mirror 22, optical-path deflecting mirrors 23a and 23b, first lenses 31a and 31b, and second lenses 32b, 32g, and 32r. The cross dichroic mirror 21 includes a first dichroic mirror 21a and a second dichroic mirror 21b as a pair of separating surfaces. The first and second dichroic mirrors 21a, 21b are perpendicular to each other and the intersection axis 21c where the two dichroic mirrors intersect extends in the z direction. That is, the intersection axis 21c is perpendicular to not only the system optical axis SA1 extending in the x direction on the light-exiting side of the illumination system 20 but also the system optical axis SA2 extending in the y direction on the light-exiting side of the first and second dichroic mirrors 21a, 21b. The system optical axis SA1 in the upstream portion of the cross dichroic mirror 21 is perpendicular to the system optical axis SA2 in the downstream portion of the cross dichroic mirror 21.

The first dichroic mirror 21a, for example, reflects the blue (B) light as one of the color components contained in the illumination light Is and transmits the green (G) light and the red (R) light as the other color components. The second dichroic mirror 21b reflects the green (G) light and the red (R) light, which are the other color components described above, and transmits the blue (B) light, which is the one of the color components described above. The dichroic mirror 22, for example, reflects the green (G) light as one of the green light and red light (GR), which are the two incident color components, and transmits the red (R) light as the other color component. In this way, the blue light, the green light, and the red light that form the illumination light having exited from the illumination system 20 are guided to first, second, and third optical paths OP1, OP2, OP3 and incident on different objects to be illuminated.

Specifically, the illumination light Is from the illumination system 20 is incident on the cross dichroic mirror 21. The blue light reflected off and separated by the first dichroic mirror 21a of the cross dichroic mirror 21 travels via the optical-path deflecting mirror 23a and impinges on a polarized light separation element 52b of the liquid crystal light valve 60b. The green light reflected off and separated by the second dichroic mirror 21b of the cross dichroic mirror 21, traveling via the optical-path deflecting mirror 23b, and further reflected off and separated by the dichroic mirror 22 impinges on a polarized light separation element 52g of the liquid crystal light valve 60g. The red light reflected off and separated by the second dichroic mirror 21b of the cross dichroic mirror 21 and passing through and separated by the dichroic mirror 22 impinges on a polarized light separation element 52r of the liquid crystal light valve 60r.

The blue light Bs that will be separated by the first dichroic mirror 21a and directed to the first optical path OP1 has a plane of polarization corresponding to the first direction, which is as a whole substantially perpendicular to the plane of incidence (plane parallel to xy plane) with respect to the first dichroic mirror 21a. That is, the blue light Bs is incident on the first dichroic mirror 21a as substantially S-polarized light and hence efficiently reflected off the first dichroic mirror 21a. The green light Gs and the red light Rs that will be separated by the second dichroic mirror 21b and directed to the second and third optical paths OP2 and OP3 have planes of polarization corresponding to the first direction, which is as a whole also substantially perpendicular to the plane of incidence (plane parallel to xy plane) with respect to the second dichroic mirror 21b. That is, the green light Gs and the red light Rs are incident on the second dichroic mirror 21b also as substantially S-polarized light and hence efficiently reflected off the second dichroic mirror 21b. It is noted that the plane of incidence is a plane containing an incident ray and an incident normal, and that the plane of incidence containing a ray parallel to the system optical axis SA1 is a plane parallel to the xy plane.

The blue light Bp that has exited from the first dichroic mirror 21a and will be reflected off the optical-path deflecting mirror 23a has a plane of polarization corresponding to the first direction, which is as a whole substantially parallel to the plane of incidence (plane parallel to yz plane) with respect to the optical-path deflecting mirror 23a. That is, the blue light Bp is incident on and reflected off the optical-path deflecting mirror 23a as substantially P-polarized light. The direction of polarization of the blue light Bp, when reflected of f the optical-path deflecting mirror 23a, apparently changes from the z direction to the y direction but actually remains in the first direction.

The green light Gp and the red light Rp that have exited from the second dichroic mirror 21b and will be reflected off the optical-path deflecting mirror 23b have planes of polarization corresponding to the first direction, which is as a whole substantially parallel to the plane of incidence (plane parallel to yz plane) with respect to the optical-path deflecting mirror 23b. That is, the green light Gp and the red light Rp are incident on the optical-path deflecting mirror 23b as substantially P-polarized light and reflected off the optical-path deflecting mirror 23b. The directions of polarization of the green light Gp and the red light Rp, when reflected off the optical-path deflecting mirror 23b, apparently change from the z direction to the y direction but actually remain in the first direction.

The green light Gp and the red light Rp that will be incident on the dichroic mirror 22 have planes of polarization corresponding to the first direction, which is as a whole substantially parallel to the plane of incidence (plane parallel to yz plane) with respect to the dichroic mirror 22. That is, the green light Gp is reflected off the dichroic mirror 22 as substantially P-polarized light, and the red light Rp passes through the dichroic mirror 22 as substantially P-polarized light. The direction of polarization of the green light Gp, when reflected off the dichroic mirror 22, apparently changes from the y direction to the z direction but actually remains in the first direction.

The first lens 31a and the second lens 32b disposed in the first optical path OP1 are provided to adjust the angular state of the blue light Bp to be incident on the liquid crystal panel 61b (the angular state is, for example, the angle of divergence of the light flux in the illuminated area). The first lens 31b and the second lens 32g disposed in the second optical path OP2 are provided to adjust the angular state of the green light Gp to be incident on the liquid crystal panel 61g. A color filter 25g accompanying the second lens 32g is not essential but provided to adjust the luminance balance of the green light Gp to be incident on the liquid crystal panel 61g. The first lens 31b and the second lens 32r disposed in the third optical path OP3 are provided to adjust the angular state of the red light Rp to be incident on the liquid crystal panel 61r. A color filter 25r accompanying the second lens 32r is not essential but provided to adjust the luminance balance of the red light Rp to be incident on the liquid crystal panel 61r.

The light modulating unit 60 includes the three liquid crystal light valves 60b, 60g, and 60r in correspondence with the three optical paths OP1, OP2, and OP3 for the respective colors described above. Each of the liquid crystal light valves 60b, 60g, and 60r is a non-luminous light modulator that modulates the spatial distribution of the intensity of the incident illumination light.

The liquid crystal light valve 60b for B light disposed in the first optical path OP1 includes the liquid crystal panel 61b illuminated with the blue light Bp, a retardation compensator 62b that corrects any phase shift at the liquid crystal panel 61b, the polarized light separation element 52b that transmits or reflects the blue light Bp to the liquid crystal panel 61b and the blue light Bp from the liquid crystal panel 61b in accordance with the state of polarization of the blue light Bp to control the input and output of the blue light Bp to and from the liquid crystal light valve 60b, and a cleanup polarizer 55b that supplements the polarized light separation characteristics of the polarized light separation element 52b. The liquid crystal panel 61b is a reflective liquid crystal panel including a backside reflection plate that causes the modulated light to exit through the surface on which the illumination light has been incident. The liquid crystal panel 61b is uniformly illuminated with the blue light Bp reflected off the first dichroic mirror 21a. The liquid crystal panel 61b, although not described using illustration, includes a light transmissive substrate having a transparent electrode and other components, a drive substrate having reflective pixel electrodes and other components, and a liquid crystal layer sealed between the light transmissive substrate and the drive substrate. In the liquid crystal light valve 60b, a light-exiting-side pattern layer 53b of the polarized light separation element 52b is formed of a wire grid-type birefringent structure in which a stripe-shaped grid made of a conductive material is formed on a light transmissive flat body plate. The light-exiting-side pattern layer 53b selectively transmits the light linearly polarized in the first direction (y direction in this case) described above out of the incident blue light Bp and guides the transmitted light to the liquid crystal panel 61b. The liquid crystal panel 61b converts part of the blue light Bp incident thereon in accordance with an image signal into light linearly polarized in the second direction (x direction in this case), which is perpendicular to the first direction, and reflects the converted light toward the polarized light separation element 52b. The light-exiting-side pattern layer 53b of the polarized light separation element 52b then selectively reflects only the light linearly polarized in the second direction that has been modulated in the liquid crystal panel 61b and has traveled through the retardation compensator 62b twice. Providing the retardation compensator 62b and the cleanup polarizer 55b allows the extinction ratio on the light-exiting side of the polarized light separation element 52b to be increased and hence the contrast of the modulated light to be improved.

In the liquid crystal light valve 60b, the blue light Bp that will be incident as the illumination light on the polarized light separation element 52b has a plane of polarization corresponding to the first direction, which is as a whole substantially parallel to the plane of incidence (plane parallel to yz plane) with respect to the light-exiting-side pattern layer 53b. That is, the blue light Bp is incident on the light-exiting-side pattern layer 53b as substantially P-polarized light and efficiently passes therethrough. On the other hand, the blue light Bs that has exited from the liquid crystal panel 61b as the image light and will be reflected off the polarized light separation element 52b has a plane of polarization corresponding to the second direction, which is as a whole substantially perpendicular to the plane of incident (plane parallel to yz plane) with respect to the light-exiting-side pattern layer 53b. That is, the blue light Bs is incident on the light-exiting-side pattern layer 53b as substantially S-polarized light and efficiently reflected off the light-exiting-side pattern layer 53b. Since the light-exiting-side pattern layer 53b is formed on the side where the light combining system 70 is present, the projected blue light Bs having the plane of polarization in the second direction can be incident on the light combining system 70 without passing through the flat body plate inclined to the system optical axis, whereby astigmatism and other aberrations associated with a projected image can be reduced.

The liquid crystal light valve 60g for green light disposed in the second optical path OP2 has the same structure as that of the liquid crystal light valve 60b for blue light. That is, the liquid crystal light valve 60b includes the liquid crystal panel 61g illuminated with the green light Gp, a retardation compensator 62g that corrects any phase shift at the liquid crystal panel 61g, the polarized light separation element 52g that transmits or reflects the green light Gp to the liquid crystal panel 61g and the green light Gp from the liquid crystal panel 61g in accordance with the state of polarization of the green light Gp to control the input and output of the green light Gp to and from the liquid crystal light valve 60*g*, a cleanup polarizer 55*g* that supplements the polarized light separation characteristics of the polarized light separation element 52*g*, and a half-wave plate 56 disposed in a most downstream position on the light-exiting side of the liquid crystal panel 61*g*. The liquid crystal panel 61*g* is a reflective liquid crystal panel including a backside reflection plate that causes the modulated light to exit through the surface on which the illumination light has been incident. The liquid crystal panel 61*g* is uniformly illuminated with the green light Gp reflected off the second dichroic mirror 21*b* and the dichroic mirror 22. In the liquid crystal light valve 60*g*, a light-exiting-side pattern layer 53*g* of the polarized light separation element 52*g* is formed of a wire-grid-type birefringent structure, selectively transmits the light linearly polarized in the first direction (z direction in this case) described above out of the incident green light Gp, and guides the transmitted light to the liquid crystal panel 61*g*. The liquid crystal panel 61*g* converts part of the green light Gp incident thereon in accordance with an image signal into light linearly polarized in the second direction (x direction in this case), which is perpendicular to the first direction, and reflects the converted light toward the polarized light separation element 52*g*. The light-exiting-side pattern layer 53*g* of the polarized light separation element 52*g* then selectively reflects only the light linearly polarized in the second direction that has been modulated in the liquid crystal panel 61*g* and has traveled through the retardation compensator 62*g* twice. Providing the retardation compensator 62*g* and the cleanup polarizer 55*g* allows the extinction ratio on the light-exiting side of the polarized light separation element 52*g* to be increased and hence the contrast of the modulated light to be improved. The half-wave plate 56 rotates the direction of polarization of the light linearly polarized in the second direction that has traveled via the light-exiting-side pattern layer 53*g* of the polarized light separation element 52*g* by 90 degrees into light linearly polarized in the first direction.

In the liquid crystal light valve 60*g*, the green light Gp that will be incident as the illumination light on the polarized light separation element 52*g* has a plane of polarization corresponding to the first direction, which is as a whole substantially parallel to the plane of incidence (plane parallel to yz plane) with respect to the light-exiting-side pattern layer 53*g*. That is, the green light Gp is incident on the light-exiting-side pattern layer 53*g* as substantially P-polarized light and efficiently passes therethrough. On the other hand, the green light Gs that has exited from the liquid crystal panel 61*g* as the image light and will be reflected off the polarized light separation element 52*g* has a plane of polarization corresponding to the second direction, which is as a whole substantially perpendicular to the plane of incidence (plane parallel to yz plane) with respect to the light-exiting-side pattern layer 53*g*. That is, the green light Gs is incident on the light-exiting-side pattern layer 53*g* as substantially S-polarized light and efficiently reflected off the light-exiting-side pattern layer 53*g*. Since the light-exiting-side pattern layer 53*g* is formed on the side where the light combining system 70 is present, the projected green light Gs having the plane of polarization in the second direction can be incident on the light combining system 70 without passing through the flat body plate inclined to the system optical axis, whereby astigmatism and other aberrations associated with a projected image can be reduced.

The liquid crystal light valve 60*r* for red light disposed in the third optical path OP3 has the same structure as that of the liquid crystal light valve 60*b* for blue light. That is, the liquid crystal light valve 60*r* includes the liquid crystal panel 61*r* illuminated with the red light Rp, a retardation compensator 62*r* that corrects any phase shift at the liquid crystal panel 61*r*, the polarized light separation element 52*r* that transmits or reflects the red light Rp to the liquid crystal panel 61*r* and the red light Rp from the liquid crystal panel 61*r* in accordance with the state of polarization of the red light Rp to control the input and output of the red light Rp to and from the liquid crystal light valve 60*r*, and a cleanup polarizer 55*r* that supplements the polarized light separation characteristics of the polarized light separation element 52*r*. The liquid crystal panel 61*r* is a reflective liquid crystal panel including a backside reflection plate that causes the modulated light to exit through the surface on which the illumination light has been incident. The liquid crystal panel 61*r* is uniformly illuminated with the red light Rp that has been reflected off the second dichroic mirror 21*b* and has passed through the dichroic mirror 22. In the liquid crystal light valve 60*r*, a light-exiting-side pattern layer 53*r* of the polarized light separation element 52*r* is formed of a wire-grid-type birefringent structure, selectively transmits the light linearly polarized in the first direction (y direction in this case) described above out of the incident red light Rp, and guides the transmitted light to the liquid crystal panel 61*r*. The liquid crystal panel 61*r* converts part of the red light Rp incident thereon in accordance with an image signal into light linearly polarized in the second direction (x direction in this case), which is perpendicular to the first direction, and reflects the converted light toward the polarized light separation element 52*r*. The light-exiting-side pattern layer 53*r* of the polarized light separation element 52*r* then selectively reflects only the light linearly polarized in the second direction that has been modulated in the liquid crystal panel 61*r*. Providing the retardation compensator 62*r* and the cleanup polarizer 55*r* allows the extinction ratio on the light-exiting side of the polarized light separation element 52*r* to be increased and hence the contrast of the modulated light to be improved.

In the liquid crystal light valve 60*r*, the red light Rp that will be incident as the illumination light on the polarized light separation element 52*r* has a plane of polarization corresponding to the first direction, which is as a whole substantially parallel to the plane of incidence (plane parallel to yz plane) with respect to the light-exiting-side pattern layer 53*r*. That is, the red light Rp is incident on the light-exiting-side pattern layer 53*r* as substantially P-polarized light and efficiently passes therethrough. On the other hand, the red light Rs that has exited from the liquid crystal panel 61*r* as the image light and will be reflected off the polarized light separation element 52*r* has a plane of polarization corresponding to the second direction, which is as a whole substantially perpendicular to the plane of incidence (plane parallel to yz plane) with respect to the light-exiting-side pattern layer 53*r*. That is, the red light Rs is incident on the light-exiting-side pattern layer 53*r* as substantially S-polarized light and efficiently reflected off the light-exiting-side pattern layer 53*r*. Since the light-exiting-side pattern layer 53*r* is formed on the side where the light combining system 70 is present, the projected red light Rs having the plane of polarization in the second direction can be incident on the light combining system 70 without passing through the flat body plate inclined to the system optical axis, whereby astigmatism and other aberrations associated with a projected image can be reduced.

The light combining system 70 is formed by bonding four rectangular prisms and thus has a substantially square shape when viewed from above. A pair of intersecting dichroic mirrors 71*a* and 71*b* are formed as combining surfaces along the X-shaped interfaces between the bonded rectangular prisms, and the intersection axis 71*c* extends in the x direction. The dichroic mirrors 71a and 71b are formed of dielectric multilayer films having different characteristics. That is, one of the dichroic mirrors, the first dichroic mirror 71a, reflects the blue light Bs, and the other dichroic mirror, the second dichroic mirror 71b, reflects the red light Rs. In the light combining system 70, the modulated blue light Bs from the liquid crystal light valve 60b is reflected off the first dichroic mirror 71a (the optical path of the blue light Bs is deflected) and exits in the z direction. The modulated green light Gp from the liquid crystal light valve 60g passes through the first and second dichroic mirrors 71a, 71b and goes straight in the z direction. The modulated red light Rs from the liquid crystal light valve 60r is reflected off the second dichroic mirror 71b (the optical path of the red light Rs is deflected) and exits in the z direction. The color light fluxes Bs, Gp, and Rs are superimposed and the colors are combined on the light-exiting side of the light combining system 70.

In the color combining process in the light combining system 70, the blue light Bs that has exited from the polarized light separation element 52b as the image light and will be reflected off the dichroic mirror 71a has a plane of polarization corresponding to the second direction, which is as a whole substantially perpendicular to the plane of incidence (plane parallel to yz plane) with respect to the dichroic mirror 71a. That is, the blue light Bs is incident on the dichroic mirror 71a as substantially S-polarized light and efficiently reflected off the dichroic mirror 71a. The green light Gp that has exited from the polarized light separation element 52g as the image light, has passed through the half-wave plate 56, and will pass through the dichroic mirrors 71a and 71b has a plane of polarization corresponding to the first direction, which is as a whole substantially parallel to the plane of incidence (plane parallel to yz plane) with respect to the dichroic mirrors 71a and 71b. That is, the green light Gp is incident on the dichroic mirrors 71a and 71b as substantially P-polarized light and efficiently passes therethrough. Further, the red light Rs that has exited from the polarized light separation element 52r as the image light and will be reflected off the dichroic mirror 71b has a plane of polarization corresponding to the second direction, which is as a whole substantially perpendicular to the plane of incidence (plane parallel to the yz plane) with respect to the dichroic mirror 71b. That is, the red light Rs is incident on the dichroic mirror 71b as substantially S-polarized light and efficiently reflected off the dichroic mirror 71b. As described above, the efficiency at which the blue light Bs, the green light Gp, and the red light Rs are combined in the light combining system 70 can be increased and color unevenness can be suppressed.

The projection system 80 projects the color image light combined in the light combining system 70 on the screen (not shown) at a desired magnification. That is, color video images or a color still image corresponding to drive signals or image signals inputted to the liquid crystal panels 61b, 61g, and 61r is projected on the screen at a desired magnification. The optical axis of the projection system 80 may be aligned with the system optical axis SA2 extending toward the light-exiting side of the light combining system 70 or may be shifted from the system optical axis SA2. Further, when the projection system 80 includes a reflection element, the optical path can be deflected in the projection system 80.

As clearly shown in the above description, according to the projector 100 of the present embodiment, since the plane of polarization of the polarized light having exited from the polarization converter 17, which is parallel to the first direction, is perpendicular to the plane of incidence with respect to the first and second dichroic mirrors 21a, 21b the separating surfaces, that is, the S-polarized light undergoes reflective color separation, the efficiency at which target wavelength light is separated when the polarized light is reflected off the dichroic mirrors 21a and 21b can be increased even when the color separation/light guiding system 40 including the dichroic mirrors 21a and 21b is a relatively simple and inexpensive one. Further, according to the projector 100 of the present embodiment, when the light fluxes having passed through the color separation/light guiding system 40 are incident on the polarized light separation elements 52b, 52g, and 52r and pass therethrough, the polarized light fluxes to be transmitted have planes of polarization parallel to the first direction, which is parallel to the planes of incidence with respect to the light-exiting-side pattern layers 53b, 53g, and 53r. The illumination light fluxes from the color separation/light guiding system 40 can therefore efficiently pass through the polarized light separation elements 52b, 52g, and 52r, whereby the liquid crystal panels can be illuminated with high-luminance light fluxes. Further, when the image light fluxes modulated by the liquid crystal panels 61b, 61g, and 61r are incident again on and reflected off the polarized light separation elements 52b, 52g, and 52r, the polarized light fluxes to be reflected has planes of polarization parallel to the second direction, which is perpendicular to the planes of incidence with respect to the light-exiting-side pattern layers 53b, 53g, and 53r. The image light fluxes having exited from the liquid crystal panels 61b, 61g, and 61r can therefore be efficiently reflected off the polarized light separation elements 52b, 52g, and 52r, whereby a bright image can be projected.

Second Embodiment

The configuration of the optical system of a projector according to a second embodiment will be described below. The projector of the second embodiment is a variation of the projector 100 of the first embodiment, and the portions that will not be particularly described are the same as those in the first embodiment.

Figure 4:
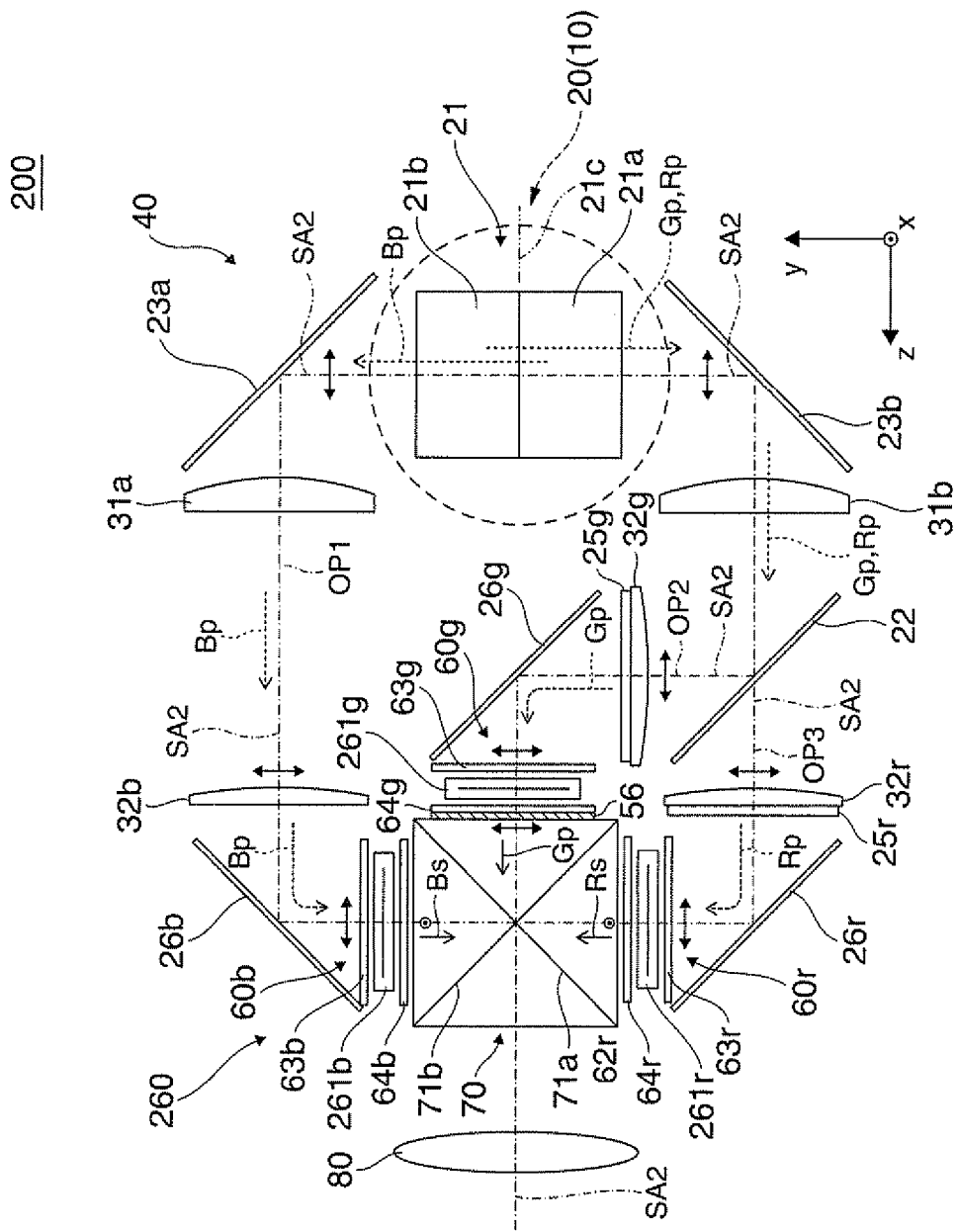
FIG. 4 describes the configuration of a key portion of the optical system of a projector according to a second embodiment.

FIG. 4 is a plan view for describing the configuration of the optical system of the projector according to the second embodiment. In the projector 200 of the present embodiment, three liquid crystal light valves 60b, 60g, and 60r that form a light modulating unit 260 are formed of transmissive liquid crystal panels 261b, 261g, and 261r that modulate transmitted light.

The liquid crystal light valve 60b for blue light disposed in the first optical path OP1 includes the liquid crystal panel 261b illuminated with the blue light Bp, a first polarizer 63b disposed on the light-incident side of the liquid crystal panel 261b, and a second polarizer 64b disposed on the light-exiting side of the liquid crystal panel 261b. The liquid crystal panel 261b, although not described using illustration, includes a light transmissive substrate having a transparent electrode and other components, a light transmissive drive substrate having pixel electrodes and other components, and a liquid crystal layer sealed between the light transmissive substrate and drive substrate. The liquid crystal light valve 60b is uniformly illuminated with the blue light Bp separated by the first dichroic mirror 21a and reflected of f optical-path deflecting mirrors 23a and 26b. The first polarizer 63b selectively transmits the light linearly polarized in the first direction (z direction in this case) described above out of the incident blue light Bp and guides the transmitted light to the liquid crystal panel 261b. The liquid crystal panel 261b converts part of the blue light Bp incident thereon in accordance with an image signal into light linearly polarized in the second direction (x direction in this case), which is perpendicular to the first direction. The second polarizer 64b selectively transmits as the image light only the light modulated in the liquid crystal panel 261b and linearly polarized in the second direction. As a result, the blue light Bs to be combined has a plane of polarization parallel to the second direction, which is as a whole substantially perpendicular to the plane of incidence (plane parallel to yz plane) with respect to the dichroic mirror 71a. That is, the blue light Bs is incident on the dichroic mirror 71a as substantially S-polarized light and efficiently reflected off the dichroic mirror 71a.

The liquid crystal light valve 60g for green light disposed in the second optical path OP2 has the same structure as that of the liquid crystal light valve 60b for blue light and includes the liquid crystal panel 261g illuminated with the green light Gp, a first polarizer 63g disposed on the light-incident side of the liquid crystal panel 261g, and a second polarizer 64g disposed on the light-exiting side of the liquid crystal panel 261g. The liquid crystal light valve 60g is uniformly illuminated with the green light Gp separated by the second dichroic mirror 21b and the dichroic mirror 22 and reflected off optical-path deflecting mirrors 23b and 26g. The first polarizer 63g selectively transmits the light linearly polarized in the first direction (y direction in this case) described above out of the incident green light Gp and guides the transmitted light to the liquid crystal panel 261g. The liquid crystal panel 261g converts part of the green light Gp incident thereon in accordance with an image signal into light linearly polarized in the second direction (x direction in this case), which is perpendicular to the first direction. The second polarizer 64g selectively transmits as the image light only the light modulated in the liquid crystal panel 261g and linearly polarized in the second direction, and the half-wave plate 56 rotates the direction of polarization of the light that has passed through the second polarizer 64g and is linearly polarized in the second direction by 90 degrees into light linearly polarized in the first direction. As a result, the green light Gp to be combined has a plane of polarization corresponding to the first direction, which is as a whole substantially parallel to the plane of incidence (plane parallel to yz plane) with respect to the dichroic mirrors 71a and 71b. That is, the green light Gp is incident on the dichroic mirrors 71a and 71b as substantially P-polarized light and efficiently passes therethrough.

The liquid crystal light valve 60r for red light disposed in the third optical path OP3 also has the same structure as that of the liquid crystal light valve 60b for blue light and includes the liquid crystal panel 261r illuminated with the red light Rp, a first polarizer 63r disposed on the light-incident side of the liquid crystal panel 261r, and a second polarizer 64r disposed on the light-exiting side of the liquid crystal panel 261r. The liquid crystal light valve 60r is uniformly illuminated with the red light Rp separated by the second dichroic mirror 21b and the dichroic mirror 22 and reflected off optical-path deflecting mirrors 23b and 26r. The first polarizer 63r selectively transmits the light linearly polarized in the first direction (z direction in this case) described above out of the incident red light Rp and guides the transmitted light to the liquid crystal panel 261r. The liquid crystal panel 261r converts part of the red light Rp incident thereon in accordance with an image signal into light linearly polarized in the second direction (x direction in this case), which is perpendicular to the first direction. The second polarizer 64r selectively transmits as the image light only the light modulated in the liquid crystal panel 261r and linearly polarized in the second direction. As a result, the red light Rs to be combined has a plane of polarization parallel to the second direction, which is as a whole substantially perpendicular to the plane of incidence (plane parallel to yz plane) with respect to the dichroic mirror 71b. That is, the red light Rs is incident on the dichroic mirror 71b as substantially S-polarized light and efficiently reflected off the dichroic mirror 71b.

As clearly shown in the above description, according to the projector 200 of the present embodiment, since the S-polarized light undergoes reflective color separation at the first and second dichroic mirrors 21a, 21b, the efficiency at which target wavelength light is separated when the polarized light is reflected off the dichroic mirrors 21a and 21b can be increased even when the color separation/light guiding system 40 including the dichroic mirrors 21a and 21b is a relatively simple and inexpensive one, as in the first embodiment. Further, according to the projector 200 of the present embodiment, when the image light fluxes that have been modulated by the liquid crystal panels 261b and 261r and have passed through the second polarizers 64b and 64r are reflected off the dichroic mirrors 71a and 71b of the light combining system 70, the image light fluxes have planes of polarization corresponding to the second direction, which is perpendicular to the planes of incidence with respect to the dichroic mirrors 71a and 71b. The image light fluxes from the liquid crystal light valves 60b and 60r can therefore be efficiently reflected off the dichroic mirrors 71a and 71b, whereby a bright image can be projected.

The invention has been described with reference to the above embodiments, but the invention is not limited thereto. The invention can be implemented in a variety of aspects to the extent that they do not depart from the substance of the invention. For example, the following variations can be employed.

That is, in the embodiments described above, the blue light Bp is guided to the first optical path OP1; the green light Gp is guided to the second optical path OP2; and the red light Rp is guided to the third optical path OP3, but the combination of the optical paths and the colors can be different. For example, the red light Rp may be guided to the first optical path OP1; the green light Gp may be guided to the second optical path OP2; and the blue light Bp may be guided to the third optical path OP3.

The method for separating the optical paths OP1, OP2, and OP3 in the color separation/light guiding system 40 is not limited to that presented in the embodiments described above, but any other variety of methods may be used.

In the projector 100 of the embodiment described above, each of the polarized light separation elements 52b, 52g, and 52r for the respective liquid crystal light valves 60b, 60g, and 60r is formed of a wire-grid-type birefringent structure, but each of the polarized light separation elements 52b, 52g, and 52r may alternatively be formed of a photonic crystal optical element-type birefringent structure obtained by stacking multiple three-dimensional dielectric layers. Still alternatively, each of the polarized light separation elements 52b, 52g, and 52r may be a typical polarizing beam splitter formed of a dielectric multilayer film.

In the projectors 100 and 200 of the embodiments described above, the illumination system 20 is formed of the light source apparatus 10, the pair of lens arrays 15 and 16, the polarization converter 17, and the superimposing lens 18, but the lens arrays 15 and 16 and other components can be omitted. Further, the light source apparatus 10 may be replaced with an LED or any other suitable light source. Moreover, the optical elements that form the illumination system 20 are not necessarily disposed along a straight line, but the system optical axis SA1 may be folded. In this case as well, the direction of polarization of the illumination light having exited from the polarization converter 17 may be changed as required so that the first direction corresponding to the plane of polarization of the illumination light to be incident on the first and second dichroic mirrors 21a, 21b is as a whole substantially perpendicular to the plane of incidence (plane parallel to xy plane) with respect to the first and second dichroic mirrors 21a, 21b.

The above embodiments have been described with reference only to the projectors 100 and 200 using the three liquid crystal light valves 60b, 60g, and 60r. The invention is also applicable to a projector using two liquid crystal light valves or a projector using four or more liquid crystal light valves.

The above embodiments have been described with reference only to a front-type projector in which an image is projected from the viewer's side, where the viewer observes the screen, but the invention is also applicable to a rear-type projector in which an image is projected from the side that is opposite the viewer's side.

The entire disclosure of Japanese Patent Application No. 2009-192850, filed Aug. 24, 2009 is expressly incorporated by reference herein.

What is claimed is:

1. A projector comprising:
   a light source;
   a polarization conversion unit that converts the light flux from the light source into polarized light having a plane of polarization parallel to a first direction;
   a color separation/light guiding system including a separating surface and at least one optical-path deflecting mirror, the separating surface separating the polarized light having exited from the polarization conversion unit into light fluxes having different wavelength bands, the separating surface being disposed in such a way that the plane of incidence of the polarized light with respect to the separating surface is perpendicular to the first direction, the at least one optical-path deflecting mirror deflecting the corresponding one of the light fluxes having traveled via the separating surface, the at least one optical-path deflecting mirror being disposed in such a way that the plane of incidence of the corresponding polarized light flux having traveled via the separating surface with respect to the optical-path deflecting mirror is parallel to the first direction; and
   a plurality of light modulators illuminated with the respective light fluxes separated by the color separation/light guiding system.

2. The projector according to claim 1,
   wherein each of the plurality of light modulators includes a reflective liquid crystal panel that outputs modulated light through the surface on which light is incident and a polarized light separation element that transmits the polarized light of the light from the color separation/light guiding system and reflects a polarized light of the light modulated by the reflective liquid crystal panel and having a plane of polarization parallel to a second direction different from the first direction, and
   the polarized light separation element is disposed in such a way that the plane of incidence of the corresponding polarized light flux from the color separation/light guiding system with respect to the polarized light separation element is parallel to the first direction.

3. The projector according to claim 2,
   wherein the polarized light separation element flat-plate-shaped optical element having a birefringent structure.

4. The projector according to claim 3,
   wherein the optical element is disposed in such a way that the plane of incidence of the polarized light from the reflective liquid crystal panel with respect to the birefringent structure is perpendicular to the second direction.

5. The projector according to claim 1, further comprising
   a light combining system including a combining surface where the light fluxes having traveled via the plurality of light modulators are combined; and
   a projection system that projects the combined light having exited from the light combining system,
   wherein each of the plurality of light modulators includes a transmissive liquid crystal panel that modulates transmitted light and a polarizer that transmits a polarized light of the light modulated by the transmissive liquid crystal panel and having a plane of polarization parallel to a second direction, and
   the light combining system is disposed in such a way that the plane of incidence of the polarized light from at least one of the plurality of light modulators with respect to the combining surface is perpendicular to the second direction.

6. The projector according to claim 1,
   wherein the color separation/light guiding system includes a first dichroic mirror and a second dichroic mirror intersecting each other as the separating surface, and
   the intersection axis of the first and second dichroic mirrors, a system optical axis extending toward the light-exiting side of the polarization conversion unit, and another system optical axis extending toward the light-exiting side of the first and second dichroic mirrors are perpendicular to one another.

7. The projector according to claim 6,
   wherein the color separation/light guiding system further includes a third dichroic mirror disposed downstream of the first and second dichroic mirrors in the optical path, the third dichroic mirror further separating one of the light fluxes separated by the first and second dichroic mirrors into light fluxes having different wavelength bands, and
   the third dichroic mirror is disposed in such a way that the plane of incidence of the one of the light fluxes with respect to the third dichroic mirror is parallel to the first direction.

* * * * *